United States Patent
Chen (10) Patent No.: US 7,395,390 B2
(45) Date of Patent: Jul. 1, 2008

(54) SYSTEM FOR BACKING UP CACHE MEMORY IN A DOUBLE BACKUP SERVER STRUCTURE

(75) Inventor: Chih-Wei Chen, Taipei (TW)

(73) Assignee: Inventec Corporation, Taipei (TW)

(*) Notice: Subject to any disclaimer, the term of this patent is extended or adjusted under 35 U.S.C. 154(b) by 212 days.

(21) Appl. No.: 11/484,672

(22) Filed: Jul. 12, 2006

(65) Prior Publication Data

US 2008/0016301 A1    Jan. 17, 2008

(51) Int. Cl.
  *G06F 13/00* (2006.01)
(52) U.S. Cl. .................................. 711/162; 711/154
(58) Field of Classification Search ................ 711/154, 711/162
  See application file for complete search history.

(56) References Cited

U.S. PATENT DOCUMENTS

2007/0067417 A1* 3/2007 Burroughs et al. .......... 709/218
2007/0101070 A1* 5/2007 Matsunami et al. .......... 711/147

* cited by examiner

*Primary Examiner*—Reba I Elmore
(74) *Attorney, Agent, or Firm*—Bacon & Thomas, PLLC (57) ABSTRACT

The present invention is to provide a system for backing up cache memory in a double backup server structure, which comprises a first backup server having a first SAS controller; a second backup server having a second SAS controller; and a SAS channel for connecting said first and second SAS controllers; wherein said first SAS controller and said second SAS controller each having a sending end initiator defining a cache mirror command. When said first backup server received a write command and write data through a Fiber Channel or iSCSI channel into a first cache memory, said first SAS controller also establishes a first Command Descriptor Block (CDB) with an operation code of a cache mirror command as well as a first data header for the cache data. Said first CDB and first data header are subsequently transmitted through said SAS channel to said second SAS controller and said second backup server writes said data into a second cache memory of its own. Accordingly, with the higher bandwidth facilitated by the SAS channel, considerable amount of cache data can be processes in high speed to improve the storage efficiency in a double backup server structure.

17 Claims, 6 Drawing Sheets

SYSTEM FOR BACKING UP CACHE MEMORY IN A DOUBLE BACKUP SERVER STRUCTURE

FIELD OF THE INVENTION

The present invention relates to a system for backing up cache memory in a double backup server structure. More particularly, the present invention relates to a system taking advantage of a high bandwidth SAS channel such that considerable amount of cache data can be processes in high speed and overall storage efficiency is improved.

BACKGROUND OF THE INVENTION

With the exponential rise in the quantity of data and restrictions imposed by government regulations, so grow the continuous demands by companies in searching for data storage means with a higher capacity and efficiency. Conventional Small Computer System Interface (SCSI) has encountered a bottleneck. To resolve this issue, storage device manufacturers re-evaluated existing storage device structures and started experimenting with new serial technologies to improve storage efficiency in enterprise server systems.

The current high speed serial technologies used in the enterprise server market can be generally categorized into two types, namely Fiber Channel and iSCSI. Fiber Channel is a gigabit speed serial technology standardized in the T11 Technical Committee of the InterNational Committee for Information Technology Standards (INCITS), an American National Standard Institute (ANSI) accredited standards committee. It is mostly implemented on fiber optic cables but can also run on twisted-pair copper wire or coaxial wire. Fiber Channel Protocol (FCP) is commonly known as the next generation SCSI protocol as it employs the SCSI transmission protocol in a fiber channel environment. On the other hand, iSCSI implements the SCSI transmission protocol in an Internet Protocol (IP) environment and transmits data over TCP/IP networks, resulting in a communication protocol standard of its own. The advantage of iSCSI is that with IP as the medium, it goes beyond the limitation in distance associated with traditional SCSI. In addition, it accommodates the existing IP network in an enterprise user's Information Technology (IT) environment and has the same structure of data access as in a current Fiber Channel Storage Area Network (FC-SAN). In fact, the difference between traditional FCP and iSCSI is the medium carrying the protocol. Both put emphasis on the concept of SAN. Therefore, the type of storage device used in the storage network will not be affected by the protocol implemented, be it iSCSI or FCP, both adapt high spin rate optical drives or SATA hard drives. The only noticeable differentiation lies in the efficiency disparity between the iSCSI and FCP protocols. From a host system's perspective, both iSCSI and FCP storage devices communicate to it via standardized Logic Unit Numbers (LUN). In other words, for storage device manufacturers, the interface to and iSCSI or FCP usually allows interoperability with affecting data accessibility.

In existing double backup server structures, the host interface to the disk array typically adopts iSCSI or Fiber Channel with a bandwidth reaching 2 Giga Byte (GB) or 4 GB. This means that the amount of data transfer has increased tremendously. However, the current known connection among disk arrays still employs Giga Byte Ethernet (GbE) protocol for cache mirroring. The 1 Gb bandwidth provided by GbE apparently can not handle the 2 GB or 4 GB data transfer required by the host interface, resulting in a starvation of storage efficiency in a double backup server structure.

SUMMARY OF THE INVENTION

In light of the obvious drawback of shortage in storage efficiency in the prior arts, after considerable research and experimentation by the inventor, a system utilizing a Serial Attached SCSI channel for backing up cache memory in a double backup server structure according to the present invention has been developed. By make use of the higher bandwidth SAS channel and defined cache mirror and flush commands, the backup server provides high volume cache access on received data to practically solve the bottleneck in the prior arts and speed up data transfer, thus effectively improving the storage efficiency in a double backup server structure.

It is an object of the present invention to provide a system for backing up cache memory in a double backup server structure, said system comprises a first backup server and a second backup; said first backup server having a first SAS controller, said second backup server having a second SAS controller; a SAS channel for connecting said first SAS controllers and said second SAS controller; said first SAS controller and said second SAS controller each having a sending end initiator defining a cache mirror command; wherein when said first backup server received a write command and write data from said host system through a Fiber Channel or iSCSI channel, in additional to writing said data into a first cache memory, said first SAS controller also establishes a first Command Descriptor Block (CDB) with an operation code of a cache mirror command as well as a first data header for the cache data including basic information such as a device number for the storage device, a block address for the cache memory and length of the data. Said first CDB and first data header are subsequently transmitted through said SAS channel to said second SAS controller and said second backup server writes said data into a second cache memory of its own. Accordingly, with the higher bandwidth facilitated by the SAS channel, considerable amount of cache data can be processes in high speed to improve the storage efficiency in a double backup server structure.

It is another object of the present invention of a system for backing up cache memory in a double backup server structure to provide a flush command for flushing cache memory in both sending end initiators of said SAS controllers so that when said data in said first cache memory has been completely stored in a first hard drive, said first SAS controller establishes a second CDB with an operation code of a flush command as well as a second data header for said data. Said second data header includes basic information such as a device number for the storage device, a block address for the cache memory and length of the data. Said second CDB and data header are subsequently transmitted through said SAS channel to said second SAS controller and said second SAS controller flushes said data stored in said second cache memory in response to said second data header.

The above and other objects, features and advantages of the present invention will become apparent from the following detailed description taken with the accompanying drawings.

DETAILED DESCRIPTION OF THE PREFERRED EMBODIMENTS

Figure 1:
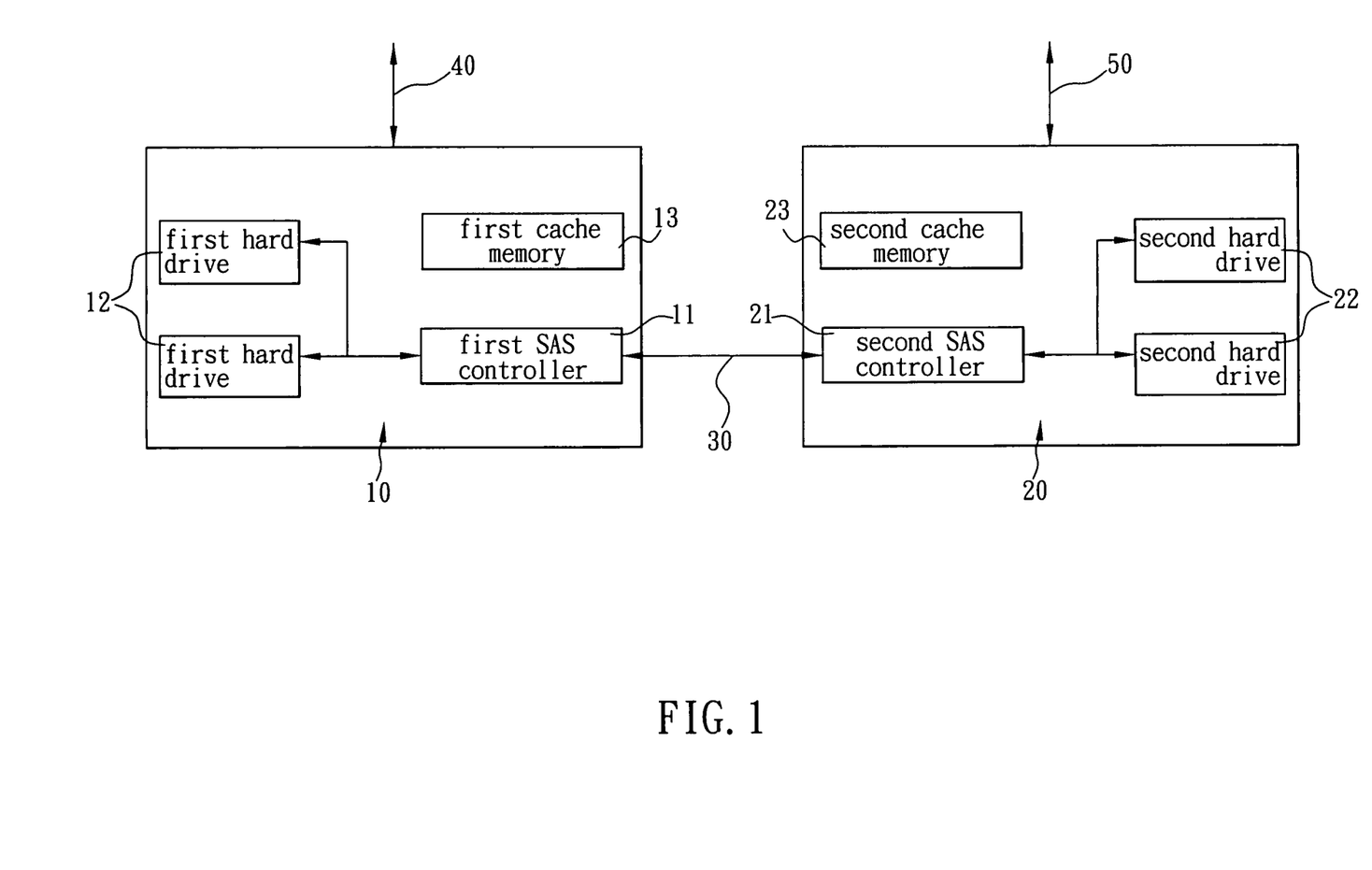
FIG. 1 is a block diagram of a preferred system according to the present invention.

Refer to FIG. 1 for a preferred embodiment of the present invention. A preferred system comprises a first backup server 10 and a second backup server 20. Said first backup server 10 has a first SAS controller 11, at least a first hard drive 12 and a first cache memory 13; said second backup server 20 has a second SAS controller 21, at least a second hard drive 22 and a second cache memory 23. A SAS channel 30 sits between said first SAS controllers 11 and said second SAS controller 21, connecting said two backup servers 10 and 20 together. At the sending ends of both said SAS controllers 11 and 21, the initiators define a mirror command for mirroring cache memory and a flush command for flushing cache memory. Said first backup server 10 and said second server 20 each receives write commands and data through a first Fiber Channel or first iSCSI channel 40 and a second Fiber Channel or second iSCSI channel 50, respectively, from a host system (not shown).

In response to a write command and write data received from said host system (not shown) through said first FC or iSCSI channel, said first backup server 10 writes said data into said first cache memory 13, said first SAS controller 11 of said first backup server 10 also establishes a first CDB with an operation code of a cache mirror command as well as a first data header for said data. Said data header includes basic information such as a device number for the storage device, a block address for the cache memory and length of the data. Said first CDB and data header are subsequently transmitted through said SAS channel 30 to said second SAS controller 20 of said second backup server 20 and then said second backup server 20 writes said data into said second cache memory 23.

In response to said data in said first cache memory 13 being completely stored in said first hard drive 12 by said first backup server 10, said first SAS controller 11 establishes a second CDB with an operation code of a flush command as well as a second data header for said data. Said second data header includes basic information such as a device number for the storage device, a block address for the cache memory and length of the data. Said second CDB and data header are subsequently transmitted through said SAS channel 30 to said second SAS controller 21 and said second SAS controller 21 flushes said data stored in said second cache memory 23 in response to said basic information in said second data header. Accordingly, with the higher bandwidth facilitated by the SAS channel, considerable amount of cache data can be processes in high speed to improve the storage efficiency in a double backup server structure.

Figure 2:
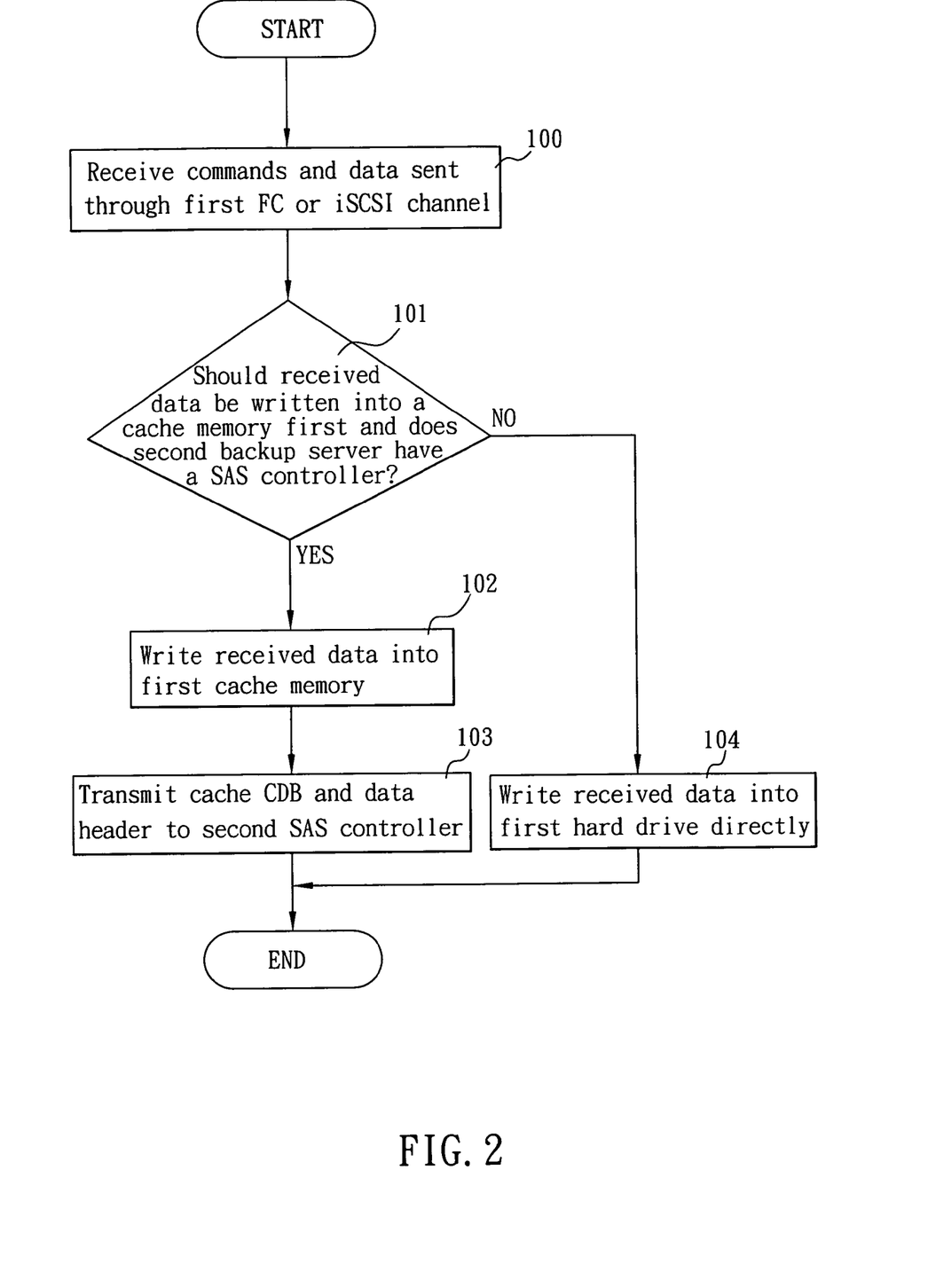
FIG. 2 is a flow chart showing the steps taken by said first backup server in FIG. 1 when receiving a command and data through a first optical channel or a first iSCSI channel.

In said preferred embodiment, said first backup server 10 applies on said command and data received through said first FC or iSCSI channel 40 with the steps shown in FIG. 2. Refer to the following descriptions.

(100) Receive commands and data sent through said first FC or iSCSI channel 40.

(101) Determine whether said received data is required to be written into a cache memory first and whether said second backup server has a SAS controller. If both answers are yes, go to step (102). Otherwise go to step (104).

(102) Write said received data into said first cache memory 13.

(103) Using the initiator at the sending end of said first SAS controller 11, establish a first CDB with an operation code of a cache mirror command as well as a first data header for said cache data. Said first CDB and first data header are then transmitted through said SAS channel 30 to said second SAS controller 21.

(104) Write said received data into said first hard drive 12 directly.

Figure 3:
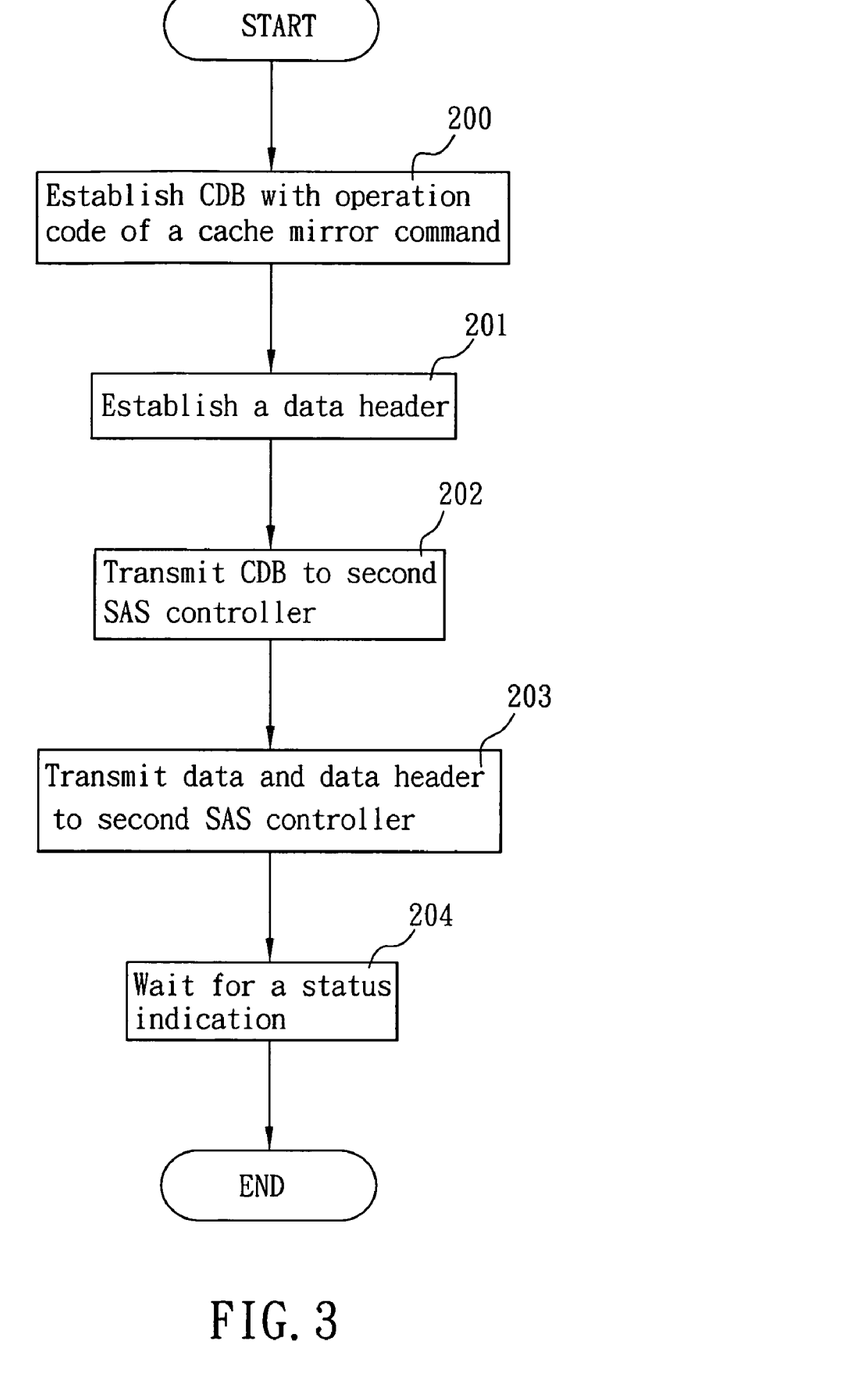
FIG. 3 is a flow chart showing the steps taken by a sending end initiator at said first SAS controller in FIG. 1 in response to received command and data.

In response to said received command and data, said sending end initiator of first SAS controller 11 applies on said command and data received with the steps shown in FIG. 3. Refer to the following descriptions.

(200) Establish said first CDB with an operation code of a cache mirror command.

(201) Establish said first data header for data in said first cache memory 13. Said first data header includes basic information such as a device number for the storage device, a block address for the cache memory and length of the data.

(202) Transmit said first CDB to said second SAS controller 21 through said SAS channel 30.

(203) Transmit said data and said first data header to said second SAS controller 21 through said SAS channel 30.

(204) Wait for a status indication to be returned by said second SAS controller 21.

Figure 4:
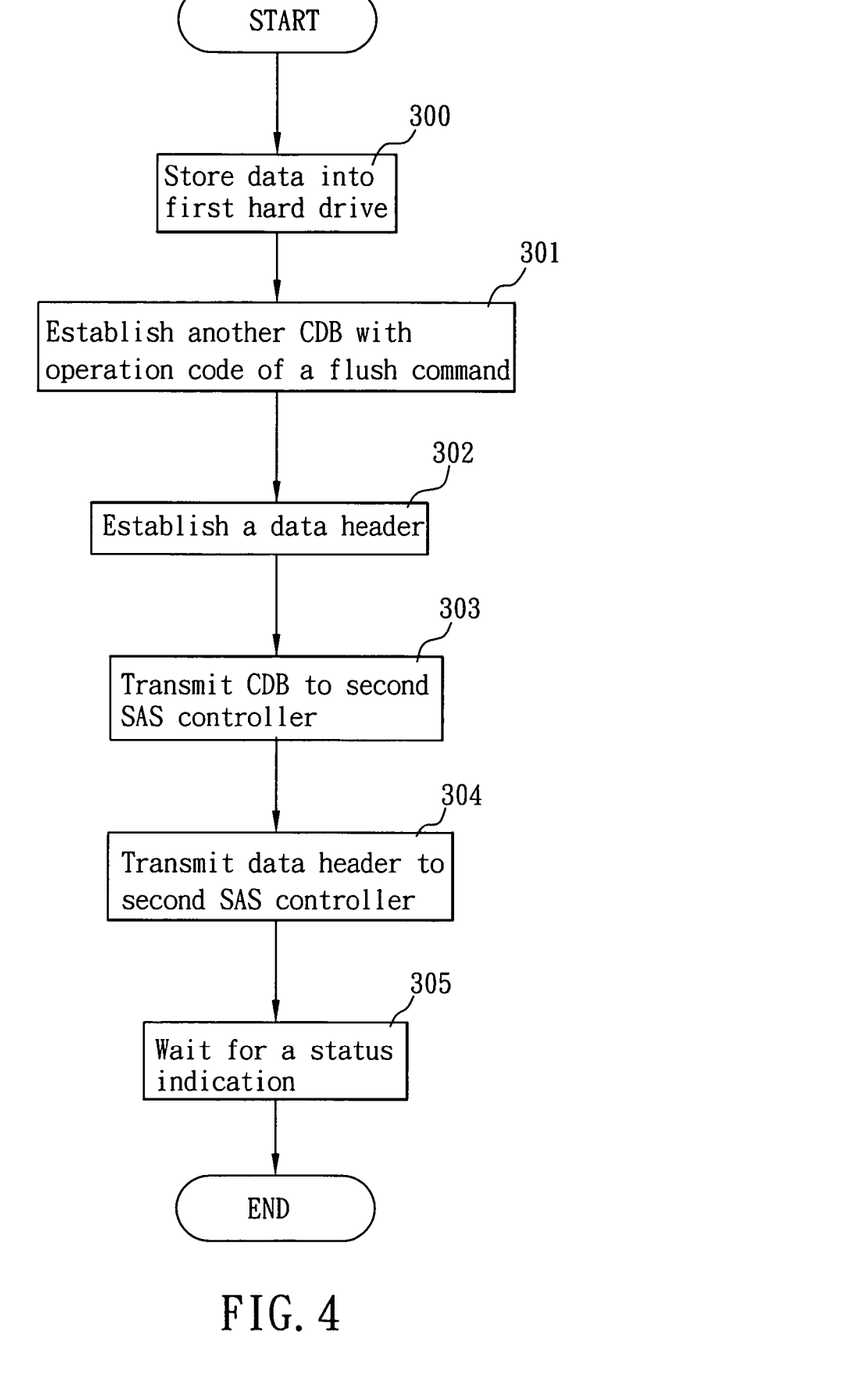
FIG. 4 is a flow chart showing the steps taken by said first SAS controller on the data in said first cache memory when said first backup server in FIG. 1 has determined said received data were correctly written into said first cache memory.

After said first backup server 10 is determined to have correctly written said received data into said first cache memory 13, said first SAS controller 11 applies on said data written in said first cache memory 13 with the steps shown in FIG. 4. Refer to the following descriptions.

(300) Store said data in said first cache memory 13 into said first hard drive 12.

(301) Establish said second CDB with an operation code of a flush command.

(302) Establish said second data header for data in said first cache memory 13. Said second data header includes basic information such as a device number for the storage device, a block address for the cache memory and length of the data.

(303) Transmit said second CDB to said second SAS controller 21 through said SAS channel 30.

(304) Transmit said second data header to said second SAS controller 21 through said SAS channel 30.

(305) Wait for a status indication to be returned by said second SAS controller 21.

Figure 5:
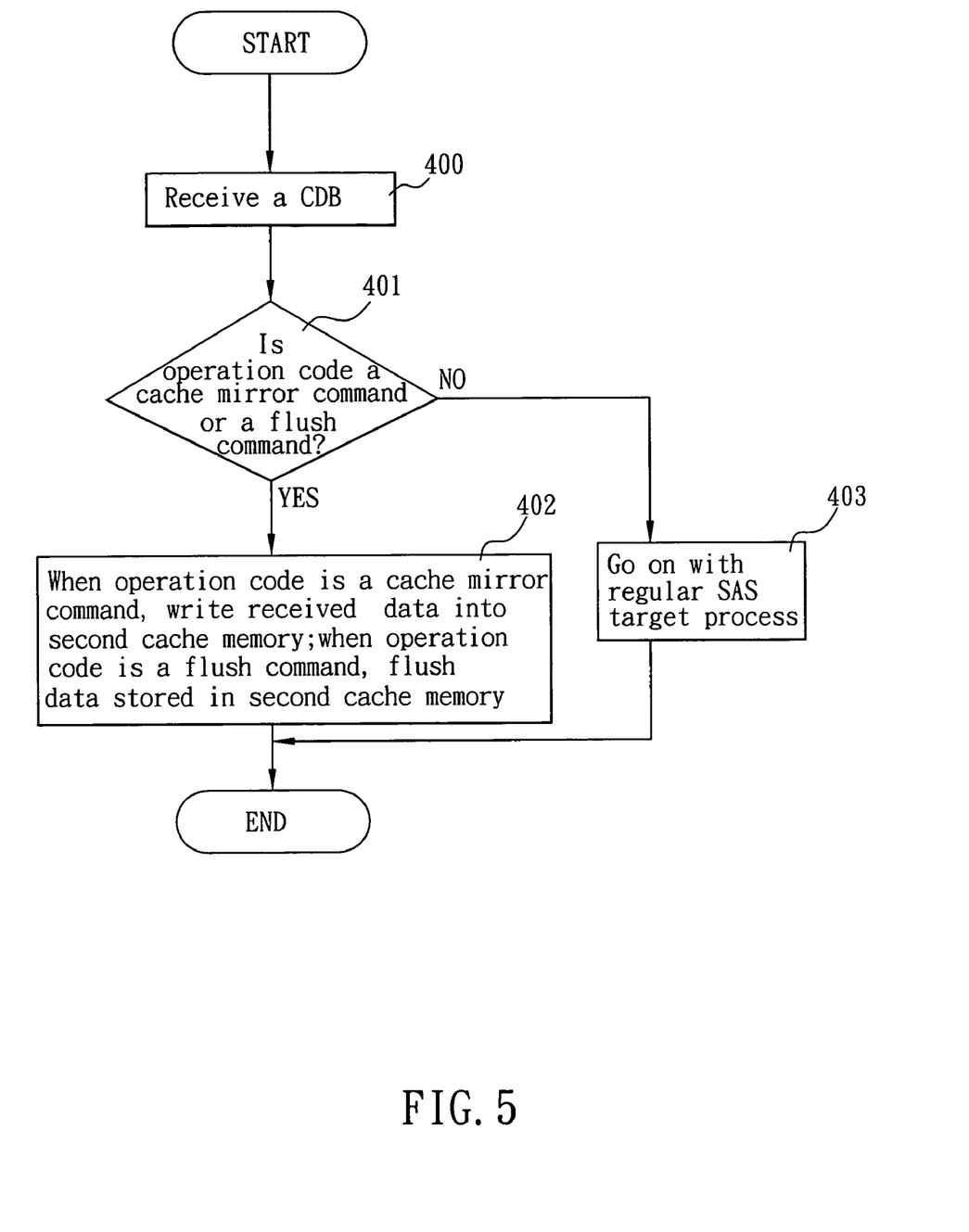
FIG. 5 is a flow chart showing the steps taken by said second backup server in FIG. 1 on said command and data transmitted by the first backup server through a SAS channel first backup server.

In said preferred embodiment, said second backup server 20 applies on said first CDB transmitted from said first backup server 10 through said SAS channel with the steps shown in FIG. 5. Refer to the following descriptions.

(400) Receive a CDB sent by said sending end initiator of first SAS controller 11 through said SAS channel 30.

(401) Determine whether the operation code in said received CDB is a cache mirror command or a flush command. If the answer is yes, continue with the next step (402). Otherwise go to step (403).

(402) When said operation code is determined to be a cache mirror command, write said received data into said second cache memory 23; when said operation code is determined to be a flush command, flush said data stored in said second cache memory 23.

(403) Go on with the next step in a regular SAS target process.

Figure 6:
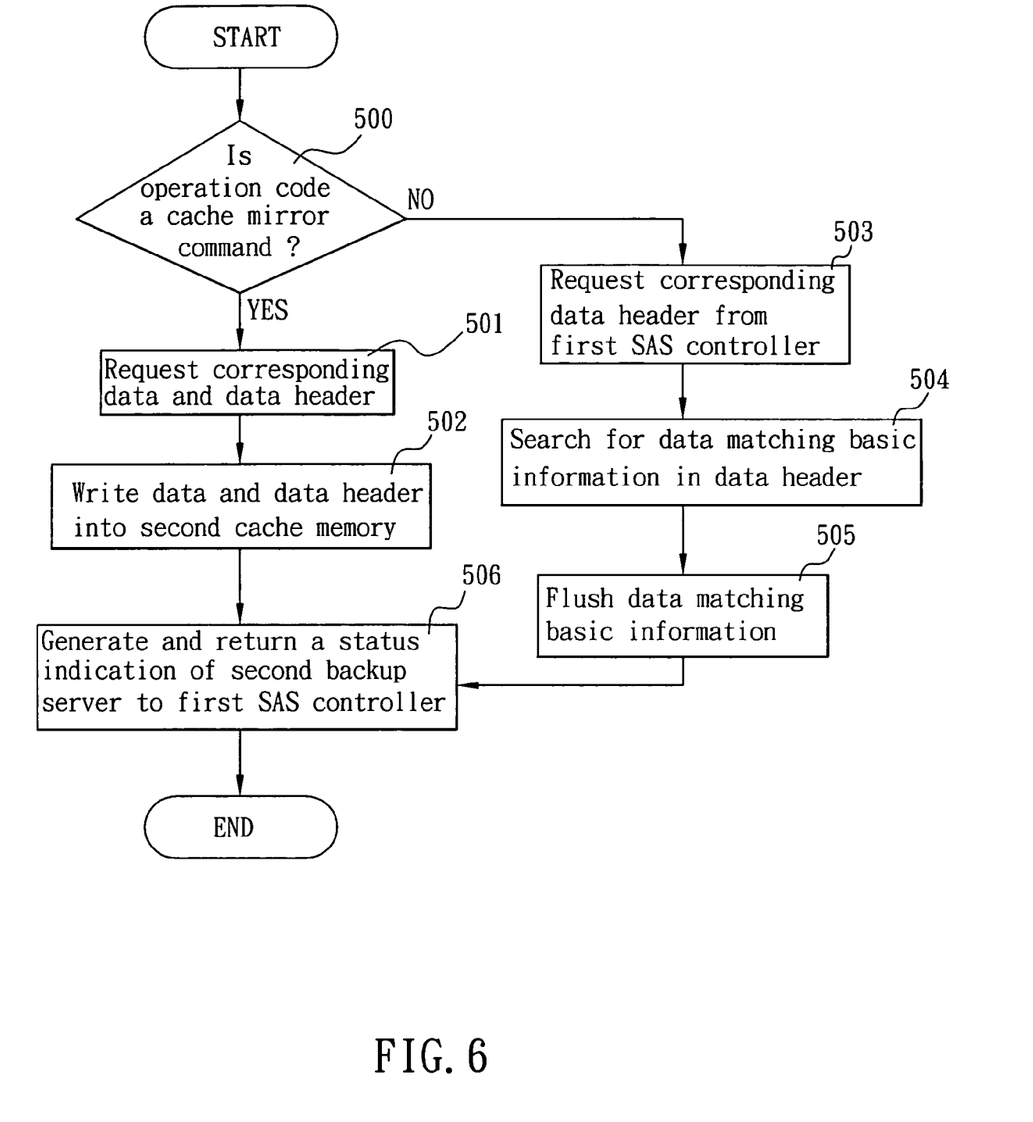
FIG. 6 is a flow chart showing the steps taken by said second SAS controller in FIG. 1 when the operation code in the received CDB is "cache mirror" or "flush".

When said operation code in said CDB received by said second SAS controller 21 is determined to be a cache mirror command or a flush command, said second SAS controller applies the steps shown in FIG. 6. Refer to the following descriptions.

(500) Determine whether said operation code in said CDB received is a cache mirror command. If the answer is yes, continue with the next step (501). Otherwise go to step (503).

(501) Request said sending end initiator of said first SAS controller 11 to send corresponding data and its data header.

(502) Write said data and said data header including basic information such as a device number for the storage device, a block address for the cache memory and length of the data into said second cache memory 23. Go to step (506).

(503) When said operation code is determined to be a flush command, request said sending end initiator of said first SAS controller 11 to send a corresponding data header.

(504) In said second cache memory 23, search for data matching basic information in said data header.

(505) Flush said data matching said basic information in said data header.

(506) Generate and return a status indication of said second backup server 20 to said sending end initiator of first SAS controller 11.

As depicted in the above-mentioned preferred embodiment, the present invention employs a SAS channel for backing up cache in a double backup server system. It takes advantage of the high bandwidth facilitated by the SAS channel and the defined cache mirror and flush command to easily execute access huge load of cache data, resolving the transmission bottleneck in prior arts. Consequently, it enables high speed data processing and improves storage efficiency in a double backup server structure.

While the invention herein disclosed has been described by means of specific embodiments, numerous modifications and variations could be made thereto by those skilled in the art without departing from the scope and spirit of the invention set forth in the claims.

What is claimed is:

1. A system for backing up cache memory in a double backup server structure, said system comprises, a first backup server having at least a first SAS controller, said first SAS controller having a sending end initiator defining a mirror command for mirroring cache memory and a flush command for flushing cache memory, a first channel for accepting write commands and write data from a host system, a first cache memory, and at least a first hard drive;

a second backup server having at least a second SAS controller, said second SAS controller having a sending end initiator defining a mirror command for mirroring cache memory and a flush command for flushing cache memory, and a second cache memory;

a SAS channel for connecting said first SAS controllers and said second SAS controller;

wherein in response to a write command and write data received from said host system through said first channel, said first backup server writes said data into said first cache memory, and said first SAS controller establishes a first CDB with an operation code of a cache mirror command as well as a first data header for said data, said first CDB and data header are subsequently transmitted through said SAS channel to said second SAS controller and said second backup server writes said data into said second cache memory, in response to said data in said first cache memory being completely stored in said first hard drive, said first SAS controller establishes a second CDB with an operation code of a flush command as well as a second data header for said data, said second CDB and data header are subsequently transmitted through said SAS channel to said second SAS controller and said second SAS controller flushes said data stored in said second cache memory in response to said second data header.

2. The system for backing up cache memory in a double backup server structure of claim 1, wherein said first backup server applies on said command and data received through said first channel with the steps of:

determining whether said received data is required to be written into a cache memory first;

when said received data is determined to be required to be written into a cache memory first, writing said received data into said first cache memory;

establishing said first CDB with an operation code of a cache mirror command as well as said first data header for said cache data, said first CDB and first data header being subsequently transmitted through said SAS channel to said second SAS controller.

3. The system for backing up cache memory in a double backup server structure of claim 2, wherein in response to said received command and data, said sending end initiator of first SAS controller applies on said command and data received with the steps of:

establishing said first CDB with an operation code of a cache mirror command;

establishing said first data header;

transmitting said first CDB to said second SAS controller through said SAS channel;

transmitting said first data header to said second SAS controller through said SAS channel; and waiting for a status indication to be returned by said second SAS controller.

4. The system for backing up cache memory in a double backup server structure of claim 2, wherein when said first backup server is determined to have correctly written said received data into said first cache memory, said first SAS controller applies on said data written in said first cache memory with the steps of:

storing said data in said first cache memory into said first hard drive;

establishing said second CDB with an operation code of a flush command;

establishing said second data header;

transmitting said second CDB to said second SAS controller through said SAS channel;

transmitting said second data header to said second SAS controller through said SAS channel; and waiting for a status indication to be returned by said second SAS controller.

5. The system for backing up cache memory in a double backup server structure of claim 3, wherein said second backup server applies on a CDB transmitted from said first backup server through said SAS channel with the steps of:

determining whether the operation code in said received CDB is a cache mirror command or a flush command;

when said operation code is determined to be a cache mirror command, writing said received data into said second cache memory;

when said operation code is determined to be a flush command, flushing said data stored in said second cache memory.

6. The system for backing up cache memory in a double backup server structure of claim 4, wherein said second backup server applies on a CDB transmitted from said first backup server through said SAS channel with the steps of:

determining whether the operation code in said received CDB is a cache mirror command or a flush command;

when said operation code is determined to be a cache mirror command, writing said received data into said second cache memory;

when said operation code is determined to be a flush command, flushing said data stored in said second cache memory.

7. The system for backing up cache memory in a double backup server structure of claim 5, wherein when said operation code in said CDB received by said second SAS controller is determined to be a cache mirror command, said second SAS controller applies the steps of:

requesting said sending end initiator of said first SAS controller to send corresponding data and data header;

writing said data and said data header into said second cache memory; and generating and returning a status indication of said second backup server to said sending end initiator of first SAS controller.

8. The system for backing up cache memory in a double backup server structure of claim 6, wherein when said operation code in said CDB received by said second SAS controller is determined to be a cache mirror command, said second SAS controller applies the steps of:

requesting said sending end initiator of said first SAS controller to send corresponding data and data header;

writing said data and said data header into said second cache memory; and generating and returning a status indication of said second backup server to said sending end initiator of first SAS controller.

9. The system for backing up cache memory in a double backup server structure of claim 5, wherein when said operation code in said CDB received by said second SAS controller is determined to be a flush command, said second SAS controller applies the steps of:

requesting said sending end initiator of first SAS controller to send a corresponding data header;

in said second cache memory, searching for data matching basic information in said data header;

flushing said data matching said basic information in said data header; and generating and returning a status indication of said second backup server to said sending end initiator of first SAS controller.

10. The system for backing up cache memory in a double backup server structure of claim 6, wherein when said operation code in said CDB received by said second SAS controller is determined to be a flush command, said second SAS controller applies the steps of:

requesting said sending end initiator of first SAS controller to send a corresponding data header;

in said second cache memory, searching for data matching basic information in said data header;

flushing said data matching said basic information in said data header; and generating and returning a status indication of said second backup server to said sending end initiator of first SAS controller.

11. The system for backing up cache memory in a double backup server structure of claim 2, wherein when said received data is not required to be written into a cache memory first, said first backup server writes said received data into said first hard drive directly.

12. The system for backing up cache memory in a double backup server structure of claim 9, wherein said basic information of said data header comprises a device number of storage device, a block address of cache memory and a data length.

13. The system for backing up cache memory in a double backup server structure of claim 10, wherein said basic information of said data header comprises a device number of storage device, a block address of cache memory and a data length.

14. The system for backing up cache memory in a double backup server structure of claim 12, wherein said first channel is a Fiber Channel.

15. The system for backing up cache memory in a double backup server structure of claim 13, wherein said first channel is a Fiber Channel.

16. The system for backing up cache memory in a double backup server structure of claim 12, wherein said first channel is an iSCSI channel.

17. The system for backing up cache memory in a double backup server structure of claim 13, wherein said first channel is an iSCSI channel.

* * * * *